(12) United States Patent
Zhang et al.

(10) Patent No.: US 10,500,756 B2
(45) Date of Patent: Dec. 10, 2019

(54) METHODS OF CONFERRING FIRE RETARDANCY TO WOOD AND FIRE-RETARDANT WOOD PRODUCTS

(71) Applicant: Koppers Performance Chemicals Inc., Pittsburgh, PA (US)

(72) Inventors: Jun Zhang, Peachtree City, GA (US); John Horton, Peachtree City, GA (US); Xinhao H. Gao, Peachtree City, GA (US)

(73) Assignee: Koppers Performance Chemicals Inc., Pittsburgh, PA (US)

( * ) Notice: Subject to any disclaimer, the term of this patent is extended or adjusted under 35 U.S.C. 154(b) by 0 days.

(21) Appl. No.: 15/314,791

(22) PCT Filed: May 27, 2015

(86) PCT No.: PCT/US2015/032546
§ 371 (c)(1),
(2) Date: Nov. 29, 2016

(87) PCT Pub. No.: WO2015/187414
PCT Pub. Date: Dec. 10, 2015

(65) Prior Publication Data
US 2017/0120473 A1  May 4, 2017

Related U.S. Application Data

(63) Continuation-in-part of application No. 14/328,075, filed on Jul. 10, 2014, now Pat. No. 9,669,564.

(60) Provisional application No. 62/007,704, filed on Jun. 4, 2014.

(51) Int. Cl.
| | |
|---|---|
| *B27K 3/16* | (2006.01) |
| *B05D 7/06* | (2006.01) |
| *B05D 1/02* | (2006.01) |
| *B05D 1/18* | (2006.01) |
| *B05D 1/28* | (2006.01) |
| *B27K 3/36* | (2006.01) |
| *B27K 3/08* | (2006.01) |
| *B27K 5/00* | (2006.01) |
| *B05D 5/00* | (2006.01) |
| *B05D 3/04* | (2006.01) |
| *B05D 7/00* | (2006.01) |
| *B05D 7/08* | (2006.01) |
| *C09K 21/04* | (2006.01) |
| *C09K 21/02* | (2006.01) |

(Continued)

(52) U.S. Cl.
CPC .............. *B27K 3/163* (2013.01); *B05D 1/02* (2013.01); *B05D 1/18* (2013.01); *B05D 1/28* (2013.01); *B05D 3/0493* (2013.01); *B05D 5/00* (2013.01); *B05D 7/06* (2013.01); *B05D 7/50* (2013.01); *B27K 3/08* (2013.01); *B27K 3/166* (2013.01); *B27K 3/36* (2013.01); *B27K 5/003* (2013.01); *B27K 5/0055* (2013.01); *C09D 5/185* (2013.01); *C09K 21/02* (2013.01); *C09K 21/04* (2013.01); *C09K 21/10* (2013.01); *B05D 7/08* (2013.01); *B05D 2203/20* (2013.01); *B05D 2401/20* (2013.01); *B05D 2502/00* (2013.01); *B05D 2503/00* (2013.01); *B05D 2504/00* (2013.01); *B05D 2505/00* (2013.01); *B05D 2508/00* (2013.01); *B27K 2200/15* (2013.01); *B27K 2200/30* (2013.01); *B27K 2240/30* (2013.01); *Y10T 428/266* (2015.01)

(58) Field of Classification Search
CPC ........ B27K 3/0278; B27K 3/52; B27K 3/163; B27K 5/0055; B27K 3/08; B27K 3/36; B27K 3/166; B27K 5/003; B27K 2200/15; B27K 2240/30; B27K 2200/30; B05D 7/06; B05D 1/28; B05D 1/18; B05D 1/02; B05D 7/08; B05D 5/00; B05D 7/50; B05D 3/0493; B05D 2203/20; B05D 2401/20; B05D 2502/00; B05D 2503/00; B05D 2504/00; B05D 2505/00; B05D 2508/00; C09K 21/10; C09K 21/04; C09D 5/185; C09D 21/02; Y10T 428/266
USPC ...................... 106/18.11; 427/297, 408, 410
See application file for complete search history.

(56) References Cited

U.S. PATENT DOCUMENTS

| | | | |
|---|---|---|---|
| 2,917,408 | A | 12/1959 | Goldstein et al. |
| 2,935,471 | A | 5/1960 | Aarons et al. |
| 3,137,607 | A | 6/1964 | Goldstein et al. |

(Continued)

FOREIGN PATENT DOCUMENTS

| | | | |
|---|---|---|---|
| CA | 917334 A | 12/1972 | |
| CL | 199200582 | 6/1992 | |
| EP | 0570233 A1 * | 11/1993 | ............. C09D 5/185 |

OTHER PUBLICATIONS

Giudice, C.A.; Canosa, G. Flame-Retardant Systems Based on Alkoxysilanes for Wood Protection. In Wood in Civil Engineering [Online]; Concu, G., Ed.; ExLi4EvA: Open Access, 2017; pp. 75-89. http://dx.doi.org/10.5772/64916 (accessed Aug. 2, 2019). (Year: 2017).*

(Continued)

*Primary Examiner* — William P Fletcher, III
(74) *Attorney, Agent, or Firm* — Covington & Burling LLP

(57) ABSTRACT

A process is provided for treating wood products including lumber, plywood and other engineered wood products comprising the steps of applying an aqueous fire-retardant impregnate and applying a coating to the surface of the wood product. In one embodiment, said process confers fire-retardant properties to the wood products sufficient to pass (Continued)

the extended burn test of ASTM E-84. The present invention also provides fire retardant wood products.

12 Claims, 2 Drawing Sheets

(51) Int. Cl.
  *C09K 21/10* (2006.01)
  *C09D 5/18* (2006.01)

(56) References Cited

U.S. PATENT DOCUMENTS

| | | | |
|---|---|---|---|
| 3,159,503 A | 12/1964 | Goldstein et al. | |
| 3,619,352 A | 11/1971 | Bell | |
| 3,682,675 A | 8/1972 | Myers | |
| 3,832,316 A | 8/1974 | Juneja | |
| 3,897,372 A | 7/1975 | Kehr et al. | |
| 4,010,296 A | 3/1977 | Oberley | |
| 4,145,296 A | 3/1979 | Fox et al. | |
| 4,197,235 A | 4/1980 | Nield et al. | |
| 4,373,010 A | 2/1983 | Oberley | |
| 4,461,720 A | 7/1984 | Loyvet et al. | |
| 4,514,326 A | 4/1985 | Salley | |
| 4,514,327 A * | 4/1985 | Rock | C09K 21/02 106/18.13 |
| 4,725,382 A | 2/1988 | Lewchalermwong | |
| 4,801,404 A | 1/1989 | Dietrich et al. | |
| 4,857,364 A * | 8/1989 | von Bonin | C08G 18/0885 427/254 |
| 4,935,457 A | 6/1990 | Metzner et al. | |
| 4,961,265 A | 10/1990 | Pennartz | |
| 5,009,964 A | 4/1991 | Leach et al. | |
| 5,076,969 A | 12/1991 | Fox | |
| 5,151,127 A | 9/1992 | Thompson | |
| 5,151,225 A | 9/1992 | Herndon et al. | |
| 5,206,088 A * | 4/1993 | Raevsky | E04B 1/94 428/413 |
| 5,225,464 A * | 7/1993 | Hill, Jr. | C08K 5/5205 252/606 |
| 5,401,793 A | 3/1995 | Kobayashi et al. | |
| 5,404,555 A | 4/1995 | Liu | |
| 5,405,555 A | 4/1995 | Riker | |
| 6,303,234 B1 | 10/2001 | Slimak et al. | |
| 6,306,317 B1 | 10/2001 | Richards et al. | |
| 6,517,748 B2 | 2/2003 | Richards et al. | |
| 6,652,633 B2 | 11/2003 | Pasek et al. | |
| 8,168,304 B2 | 5/2012 | Zhang et al. | |
| 8,344,055 B1 | 1/2013 | Mabey et al. | |
| 8,425,980 B2 | 4/2013 | Maynard | |
| 8,663,427 B2 | 3/2014 | Sealey et al. | |
| 8,685,206 B2 | 4/2014 | Sealey et al. | |
| 8,715,540 B2 | 5/2014 | Curzon et al. | |
| 8,871,053 B2 | 10/2014 | Sealey et al. | |
| 8,871,058 B2 | 10/2014 | Sealey et al. | |
| 2002/0011593 A1 | 1/2002 | Richards et al. | |
| 2007/0116991 A1 | 5/2007 | Balthes et al. | |
| 2007/0197686 A1 * | 8/2007 | Dimanshteyn | C09D 5/18 523/179 |
| 2008/0193785 A1 * | 8/2008 | Kingma | B05D 7/08 428/541 |
| 2008/0265223 A1 | 10/2008 | Sopheap et al. | |
| 2013/0230668 A1 | 9/2013 | Maynard | |

OTHER PUBLICATIONS

New ASTM Fire Standard Provides Detailed Description of Extended Duration Surface Burning Characteristics, ASTM International News Releases 8966 (Sep. 19, 2011).
Proposed Revisions to the Acceptance Criteria for Fire-Retardant-Treated Wood (AC66), ICC Evaluation Service (Dec. 2013).
Standard Test Method for Surface Burning Characteristics of Building Materials, ASTM International, Designation: E84-10 (Jun. 2014).
Winandy, "Effects of Fire Retardant Retention, Borate Buffers, and Redrying Temperature After Treatment on Thermal-Induced Degradation," 47(6) J. Forest Prods. 79-86 (Jun. 1997).
PCT International Search Report (PCT Article 18 and Rules 43 and 44) for PCT/US15/32546 (dated Aug. 13, 2015).
PCT Written Opinion of the International Searching Authority (PCT Rule 43bis.1) for PCT/US15/32546 (dated Aug. 13, 2015).
Partial Supplemental European Search Report and Provisional Opinion Accompanying the Partial Search Result dated Jan. 11, 2018, issued in Application No. 15803117.9.
Chilliean Office Action dated Apr. 11, 2018, issued in Application No. 201603098.

* cited by examiner

METHODS OF CONFERRING FIRE RETARDANCY TO WOOD AND FIRE-RETARDANT WOOD PRODUCTS

CROSS-REFERENCE TO RELATED APPLICATIONS

This application is related to, and claims benefit of, U.S. application Ser. No. 14/328,075, filed on Jul. 10, 2014, now U.S. Pat. No. 9,669,564 B2; and U.S. Provisional Patent Application No. 62/007,704, filed on Jun. 4, 2014, both of which are incorporated herein by reference in their entirety.

FIELD OF THE INVENTION

This invention relates generally to fire-retardant-treated wood products and, more particularly, to fire-retardant wood products comprising a fire retardant impregnate and a surface coating that impart both fire retardant properties and thermal stability under high temperature and humidity conditions.

BACKGROUND OF THE INVENTION

Fire-retardant compositions are well known for decreasing the flammability or combustibility of materials, in particular wood and wood products, and for increasing the resistance of these materials to heat and flame damage. Wood and wood products have numerous desirable qualities as construction materials, including relatively low cost, structural strength, paint-ability and stain-ability, insulating properties, wide availability, renewability of the resource, and pleasing aesthetically characteristics. As a result, wood and wood products are used extensively as building materials for residential and commercial applications by the construction industry. Flammability, however, is the most notable disadvantage of using wood and wood products as construction materials. The susceptibility of wood to fire-related damage leads to millions of dollars per year in property damage, and also produces significant human injury and loss of life.

A number of building codes, for example, the International Residential Code (IRC), the Life Safety Code (NFPA 101), and the Building Construction and Safety Code (NFPA 5000), recognize that wood impregnated with fire retardant compositions that meet certain performance criteria may be used in place of noncombustible materials for exterior walls of Type I, II, III and buildings and in roof structures of type II and low-rise buildings of Type I construction (NFPA 5000). Most of these building codes require fire-retardant treated wood (FRTW) to perform to certain levels in accordance with tests set out in ASTM E-84 ("Standard Test Method of Surface Burning Characteristics of Building Materials"), NFPA 255 ("Standard Method of Test of Surface Burning Characteristics of Building Materials") or UL 723 ("Standard for Test for Surface Burning Characteristics of Building Materials")(each incorporated herein by reference in their entireties). Although the standard flame-spread test in ASTM E-84, for example, is based on a 10-minute exposure in a fire test tunnel furnace, under controlled conditions of draft and temperature, as specified in ASTM E-84, the test period for FRTW is extended to 30 minutes to confirm that the wood does not demonstrate significant progressive combustion. According to these tests, wood designated FRTW must demonstrate surface burning characteristics in a 30-minute extended burn test that the "flame spread index shall be 25 or less and there shall be no evidence of significant progressive combustion when the test is continued for an additional 20-minute period. Additionally, the flame front shall not progress more than 10½ feet (3200 mm) beyond the centerline of the burners at any time during the test. The smoke-developed index shall be 450 or less."

Generally, commercial fire-retardant formulations for pressure impregnating wood products contain: (1) various phosphate compounds, including mono-ammonium phosphate, diammonium phosphate, ammonium polyphosphate and metal salts of phosphoric acid; (2) sulfate compounds, such as ammonium sulfate, copper sulfate, and zinc sulfate; (3) halogenated compounds, such as zinc chloride and ammonium bromide; (4) nitrogen compounds, such as dicyandiamide and urea; or (5) boron compounds, such as boric acid, sodium borates or other metal borates.

Phosphate-based fire retardant compositions have long been used to confer fire retardant properties onto wood impregnated with such composition and are very effective fire-retardant chemicals. Phosphate compounds raise concerns with respect to their effect on the structural integrity of wood and wood products, especially at higher loading in wood products. Phosphate compounds hydrolyze into phosphoric acid when exposed to prolonged heat and moisture and may react with the wood and degrade the treated wood structure through an acid degradation reaction which reduces the mechanical strength of the treated wood over time. The generation of phosphoric acid in wood degradation is enhanced in environments of elevated temperature and moisture such as in roof and attic areas. Higher loading of phosphate-based fire retardants also increases the hygroscopicity of the treated wood. Increased hygroscopicity and increased generation of phosphoric acid can impact the structural integrity of the treated wood. Many building codes also require other tests to assess the Flexural Strength and Stiffness Properties (ASTM D5516) of wood, its hygroscopicity (ASTM D3201) and its corrosiveness (American Wood Protection Association (AWPA) E-12 procedure).

For example, U.S. Pat. No. 3,832,316 to Juneja discloses a fire retardant for wood consisting of melamine, phosphoric acid, dicyandiamide and formaldehyde. The same inventor, Juneja, also discloses a fire-retardant composition for wood in the Canadian Patent No. 917,334 comprising urea, phosphoric acid, dicyandiamide and formaldehyde.

Several other patents, including U.S. Pat. Nos. 4,010,296; 3,137,607; and 2,935,471, describe fire-retardant compositions comprising dicyandiamide and phosphoric acid in free form or a phosphate. U.S. Pat. No. 2,917,408 to Goldstein et al., describes a fire retardant compositions for use on wood having a phosphorus-amine complex, which is a combination of phosphoric acid and dicyandiamide. Similarly, U.S. Pat. No. 3,159,503 to Goldstein et al. uses a combination of formaldehyde, phosphoric acid and dicyandiamide to impart fire-retardant properties to wood. In a slightly different approach, U.S. Pat. No. 6,652,633 discloses a fire-retardant composition based on guanylurea phosphate and boric acid. As can be deduced from these examples, a vast majority of fire-retardant compositions contain phosphoric acid or reaction by-products of phosphoric acid. U.S. Pat. No. 4,725,382 discloses a water soluble fire retardant composition containing phosphate compounds and boron compound for pressure impregnation. U.S. Pat. No. 5,151,225 discloses a fire retardant composition comprising oxyacid of phosphorus, a borate compound and an amide compound with a pH range of 4.75 and 5.25. U.S. Pat. No. 4,461,720 discloses a fire retardant composition containing a solution of methylated guanyl urea and melamine with molar ratio of guanyl urea to melamine in the range of 5:1 to 10:1. Oberley U.S. Pat. No. 4,373,101 discloses a fire retardant composition comprising mixture of boric acid and a partial reacting product of dicyandiamide and phosphoric acid. Several additional examples of such phosphoric acid- or phosphate-containing fire retardants include U.S. Pat. Nos. 4,373,010; 4,514,326; and 4,725,382. Alternatively, U.S. Pat. Nos. 6,517,748 and 6,306,317 disclose phosphoric acid-free/phosphate-free fire-retardant formulations containing nitrogen compounds and boron compounds.

Nitrogen and boron compounds also raise concerns when used in fire-retardant formulations for treating wood. Nitrogen compounds, such as urea and dicyandiamide, have undesirable hygroscopic properties. In high concentration or high chemical loading in wood products, these chemicals can draw moisture from the air making the treated wood very hygroscopic. The undesirable hygroscopic property can adversely causes chemical blooming out from the treated wood, more corrosion to metal fasteners, and thermal degradation of wood cellulose fiber when used along with phosphate based compounds.

The industry uses coatings for treating wood products to provide them with a fire rating.

Commercial formulations for coating wood products for the purposes of fire ratings are well known in the art. Generally, such coatings comprise one or more polymer binders, a mineral acid catalyst, a carbon source, and a source of non-flammable gas (i.e. a blowing agent or a foaming agent).

As described above, the industry uses either fire-retardant impregnates to confer fire retardance to wood, or uses coatings to provide a fire rating. In addition to the disadvantages discussed above with those methods, certain wood products do not pass the ASTM E-84 30-minute burn test.

Despite many efforts to address these deficiencies in fire-retardant formulations, there remains an unmet need to develop a fire-retardant technology for wood products with sufficient fire-retardant properties to pass industry and code-specified tests for fire retardance and suitable for commercial use. For example, the optimal fire retardant should be less hygroscopic and less corrosive to metal fasteners, has long-term thermal stability, and imparts excellent fire-retardant characteristics to wood based products. This need is addressed by the invention disclosed herein.

The instant invention is also advantageous because it minimizes or even eliminates the use of phosphate compounds. This is advantageous because it avoids the drawbacks of the prior art where wood treated with phosphate-based fire retardant compositions degraded when exposed to prolonged heat and moisture. Phosphorus and, in particular, phosphate-containing compounds can lead to the formation of phosphoric acid which, over time, will degrade wood.

BRIEF DESCRIPTION OF THE DRAWINGS

FIG. 1(a) shows wood treated in accordance with the invention as set forth in Example 5 for comparison to FIG. 1(b) which shows wood treated by Reference Example C. The wood in FIG. 1(a) passed the test. The wood in FIG. 1(b) failed the test.

SUMMARY OF THE INVENTION

Figure 1A:
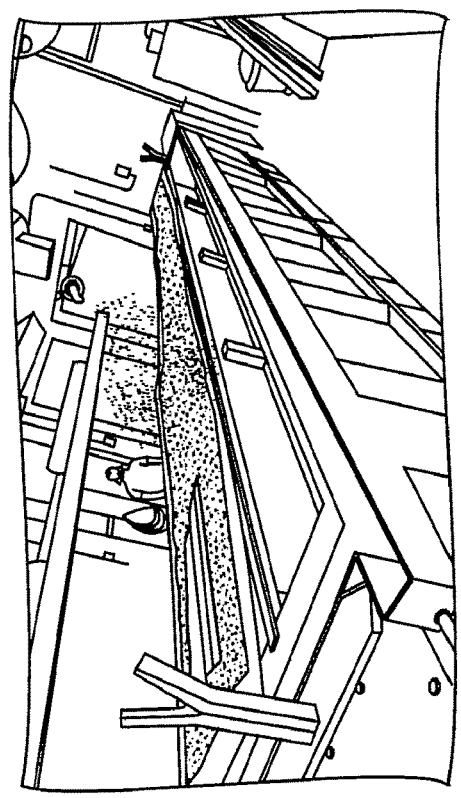
FIGS. 1(a) and 1(b) depict photographs of wood (plywood panels) that were subjected to the ASTM E-84 Tunnel Test.
Figure 1B:
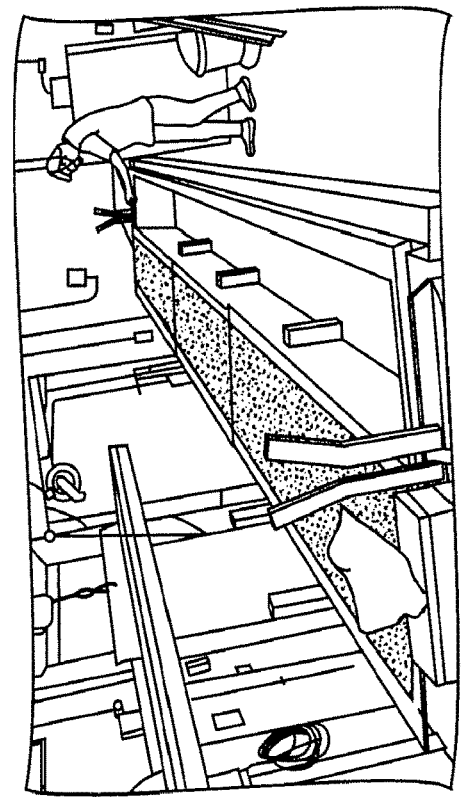
Figure 2:
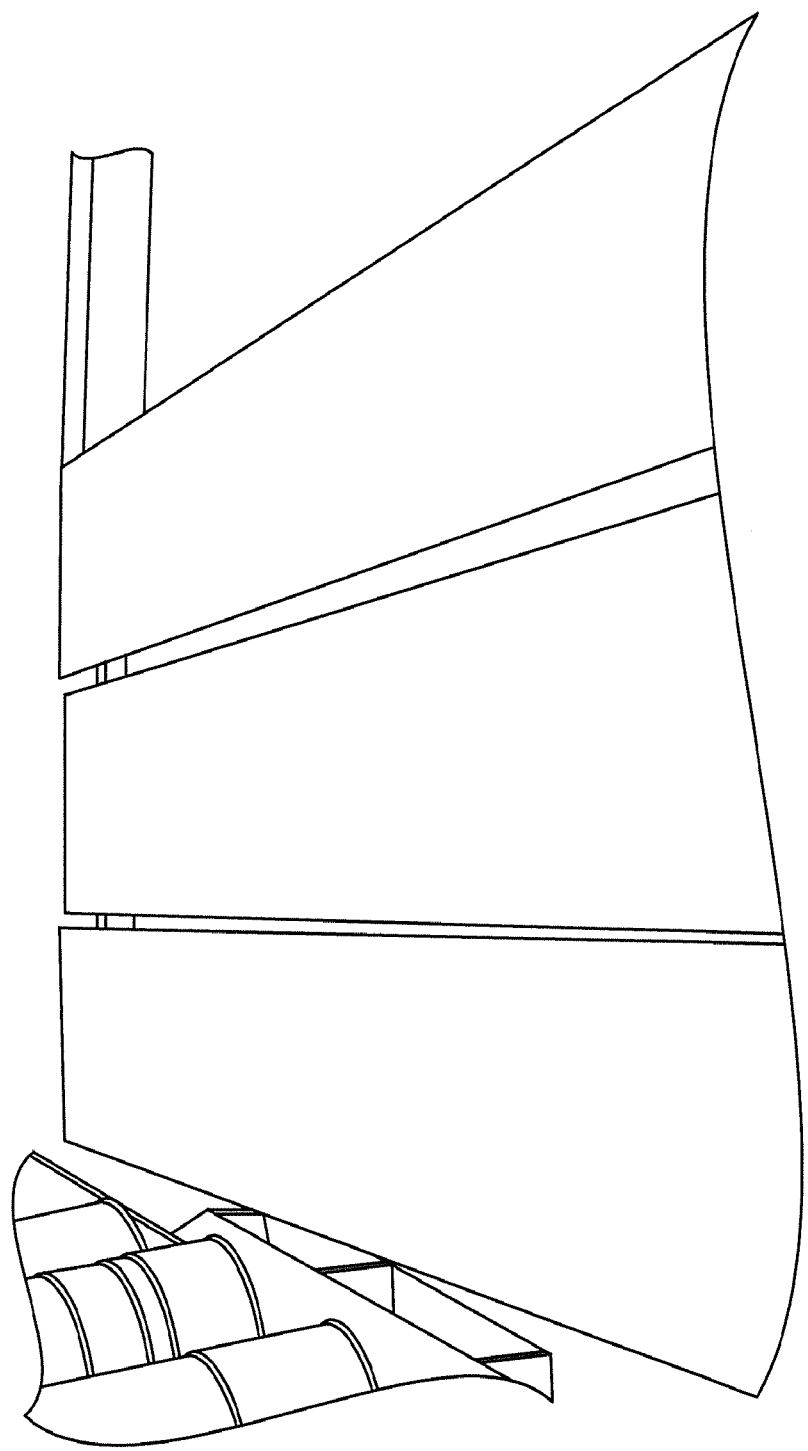
FIG. 2 depicts photographs of wood (plywood panels) before burn test.

The present invention provides methods of conferring fire retardancy to wood. Methods comprising at least two steps are provided to treat wood products. The method includes impregnating wood with a fire retardant formulation followed by applying a fire retardant coating on the surface. The resulting wood or wood products passes the extended burn test of ASTM E-84. The term "pass the test" means that the Flame Spread Index determined by E-84 Method is 25 or less and that the wood product has been subjected to 30-minutes test duration during which the flame spread or the maximum distance the flame travels along the length of the sample from the end of the igniting flame does not progress more than 6 feet (or 6 feet as measured in the tunnel), or does not progress more than 10.5 feet beyond the center line of the burners. For consistency of the discussion, we will use the maximum distance that the flame travels along the length of the sample from the end of the igniting flame (or the distance spread as measured in the tunnel). In one embodiment, the wood product exhibits a flame spread, according to ASTM E-84 (extended 30-minute burn test) of not more than more than 6.5 feet (or 6.5 feet as measured in the tunnel), or does not progress more than 10.5 feet beyond the center line of the burners.

In a preferred embodiment, the wood products are first pressure and/or vacuum impregnated with a liquid formulation comprising a phosphate based or non-phosphate based fire retardant chemicals, followed by application of a fire retardant coating on the surface of the wood products. In one embodiment, the wood product is dried before application of the coating. In one embodiment, the drying is kiln drying.

In another preferred embodiment, the wood products are microwave treated with an aqueous formulation comprising a phosphate based or non-phosphate based fire retardant chemicals, followed with applying a fire retardant coating on the surface of the wood products. In one embodiment, the wood product is dried before application of the coating. In one embodiment, the drying is kiln drying.

In another preferred embodiment, the wood products are pressure and/or vacuum impregnated with an aqueous formulation comprising a phosphate based or non-phosphate based fire retardant chemicals, followed by application of an intumescent fire retardant coating on the surface of the wood products. In one embodiment, the wood product is dried before application of the coating. In one embodiment, the drying is kiln drying, In another preferred embodiment, the wood products are microwave treated with an aqueous formulation comprising a phosphate based or non-phosphate based fire retardant chemicals, followed by application of an intumescent fire retardant coating on the surface of the wood products. In one embodiment, the wood product is dried before application of the coating. In one embodiment, the drying is kiln drying.

The present invention further provides an aqueous fire-retardant composition for the treatment of a wood product comprising a phosphate compound. The present invention also provides an aqueous fire-retardant composition comprising a boron compound and/or a nitrogen compound. The boron compound is one or more of boric acid, a borate such as sodium octaborate, sodium pentaborate and associated hydrates, sodium tetraborate, tetraboric acid; metaboric acid; or other salts of boron compounds. In another embodiment, the compositions may include at least one additional ingredient such as nitrogen-containing compounds. In one preferred embodiment, the at least one additional ingredient is dicyandiamide, urea, guanylurea phosphate, melamine phosphate, an ammonium phosphate, a cyanamide, a diammonium phosphate, or ammonium polyphosphate.

The present invention additionally provides an aqueous fire-retardant intumescent coating composition for the second step treatment comprising a polymer, a source of mineral acid catalyst such as ammonium polyphosphate or potassium tripolyphosphate, a source of carbon such as dipentaerythritol, pentaerythritol, or dextrin, and a source of non-flammable gas such as melamine, or urea.

The present invention also provides an aqueous fire-retardant coating composition for the second step treatment comprising a polymer, inorganic fire retardant materials such as zinc oxide, zinc borate, aluminum trihydroxide, halogenated compounds, or antimony trihydroxide.

The fire-retardant coating composition for the second step treatment is not limited to aqueous coating, it can be a solvent-based coating, solvent less coating, UV coating, Electron Beam coating, polyurea coating, polyurethane coating, or powder coating with fire-retardant components to provide additional fire protection.

The two-step process can be used to treat a variety of wooden materials, including wood, lumber, engineered wood products such as plywood, oriented strand board (OSB), medium density fiberboard (MDF), laminated veneer lumber (LVL) particleboard, paper, textiles, rope, and the like, with the compositions of the present invention.

The present invention also provides fire-retardant wood products.

DETAILED DESCRIPTION OF THE INVENTION

As used herein, the term "fire retardant" means a composition that renders the material to which it is applied more resistant to heat, flame and combustion than the same material without having the composition applied.

The fire retardant treatment process disclosed in the present invention can be used for wood products. As used herein, the term "wood products" refers to cellulosic material, such as wood and wood products. Non-limiting examples of various wood products contemplated for use with the present fire-retardant compositions include lumber, plywood, oriented strand board (OSB), fiberboard including low/medium/high density fiberboard (LDF, MDF, HDF), particle board, structural composite lumber (SCL) including laminated veneer lumber (LVL), parallel strand lumber (PSL), laminated strand lumber (LSL) and oriented strand lumber (OSL), or other types of engineered wood products.

The invention provides wood products of varying thicknesses and methods of treating wood products of varying thicknesses. As used herein, the term "thickness" includes both the true thickness and the nominal thickness of the wood product. One of ordinary skill in the art would readily appreciate that the nominal thickness of wood products refers to the thickness designated by the industry which may not reflect the true thickness. In one embodiment, the nominal thickness of the wood product is ½ of an inch. For example, the invention includes treating Southern yellow pine plywood with a nominal thickness of ½ inch. In another embodiment, the nominal thickness of the wood product is ⅝ of an inch. For example, the invention includes treating Southern yellow pine plywood with a nominal thickness of ⅝ inch. In a still further embodiment, the thickness of the wood products can vary from a few tenths of an inch to several or more inches. For example, when solid swan lumber is used, the thickness can vary from 1 inch to about 6 inches, and the preferred thickness about 1-2 inches. By way of further example, when plywood, OSB or LVL is used, the nominal thickness can be ¼", ⅜", 7/16", 15/32", ½", ⅝", ¾", 1⅛", or 2", and the preferred nominal thickness is about ⅜", ½" and ⅝". In another embodiment, the thickness of the wood can be up to about 12 inches. For example, when engineered wood products such as LVL, LSL, OSL, and PSL are used, the nominal thickness of the wood can be up to about 10 or 12 inches. Wood species that can be used in the methods and products of the invention include hard wood species as well as soft wood species, such as Southern Yellow Pine (SYP).

The present technology provides a two-step process for providing wood products with fire retardant performance. In one step of the treatment, the wood products are treated with a fire retardant composition. The treating fluid may be applied to wood by dipping, soaking, spraying, brushing, applying vacuum/pressure or microwave or any other means well known in the art. In one preferred embodiment, vacuum and/or pressure techniques are used to impregnate the wood in accord with this invention including the standard processes, such as the "Empty Cell" process, the "Modified Full Cell" process and the "Full Cell" process, and any other vacuum and/or pressure processes which are well known to those skilled in the art. The standard processes are defined as described in AWPA Book of Standards, (American Wood Protection Association, (Birmingham, Ala.) (2013). In the "Empty Cell" process, prior to the introduction of preservative, materials are subjected to atmospheric air pressure (Lowry) or to higher air pressures (Rueping) of the necessary intensity and duration. In the "Modified Full Cell" process, the initial vacuum used is lower than the final vacuum for the purpose of enhancing adequate kick back of the treating solution. The initial vacuum in this process is adjusted prior to the filling cycle to a level between atmosphere pressure and maximum vacuum. In the "Full Cell Process", the initial vacuum is not less than 77 kPa (22 inch Hg) for not less than 30 minutes before the cylinder is filled with preservative. Without breaking the vacuum the cylinder is filled with treating liquids and pressure is applied. After the pressure period, the cylinder is drained and a final vacuum may or may not be applied. In some embodiments, the pressure/vacuum impregnated wood product may be heat or kiln dried prior to application of the coating layer.

In another embodiment, the impregnate may be applied by a microwave or radio frequency treating process. In one particular embodiment, the impregnate may be applied by a microwave or radio frequency treating process as described in U.S. Patent Application Publication No. 20130230668, which is incorporated herein by reference in its entirety. In this process, the wood products are first heated using a radio frequency or microwave energy. The temperature of the heated target zone can vary from 40° C. to 300° C., and more preferably 80° C. to 100° C. Immediately after the heating, a liquid fire retardant formulation is contacted with the substrate. The temperature of the liquid formulation is below that of the heated target zone at the time the composition is applied, the difference between the temperatures of the composition and the heated target zone being sufficient to reduce pressure in the substrate after the composition is applied. Various frequencies of radio or microwave energy may be used. The frequency of the radio frequency or microwave energy can vary from 0.1 MHz to 100 MHz, preferably between 10 and 50 MHz, a more preferably from 20 to 40 MHz. Skilled persons may readily appreciate appropriate wavelengths outside this range.

As used herein, "fire-retardant impregnate" refers to any compound, composition or formulation that is used to impregnate a wood product and confer fire-retardant properties on that wood product. Compounds and formulations which have been found to be most effective in producing flame retardance are compounds containing bromine, chlorine, or phosphorous, or two or more of these elements. Other elements which have exhibited some flame retardant effects are antimony, boron, nitrogen, silicon, and zinc and are often combined with other compounds such as phosphorous- and halogen-containing compounds.

Halogenated compounds based on chlorine and bromine are effective flame retardants. Bromine-based fire retardants (often in combination with antimony trioxides and trihalides), such as decabromodiphenyl oxide, act in the condensed phase to redirect or terminate reactions in combustion.

Metal hydroxides (including aluminum and magnesium hydroxides) are another common flame retardant. Aluminum and magnesium hydroxides may be used in their hydrated forms. Metal hydroxides also act as smoke reducers.

Boron-containing compounds (including hydrated forms) generally function as char generators. Char layers reduce flame spread by blocking oxygen from the surface of a wood product and slowing the escape of gases of combustion. Combined with zinc, boron-containing compounds are also effective smoke-reducing agents.

Phosphorous-containing compounds are effective flame-retardant agents that generally reduce combustion and produce char. Combinations of phosphorous- and phosphate-containing compounds with nitrogen-containing compounds, such as melamine and urea, for example, enhance flame retardance. Another example of a combination of nitrogen- and phosphorous-containing compounds is ammonium polyphosphate, which promotes intumesce. Intumescent material enhances charring and creates a barrier that blocks heat and oxygen from the flammable surface.

Fire retardant impregnate compositions suitable for use in the present invention are described in U.S. Pat. No. 5,009,964 (incorporated herein by reference in its entirety).

The fire retardant compositions used in the present invention can be any fire retardant composition known in the art, including phosphate-based formulation or a non-phosphate-based compositions. Suitable fire-retardant compositions are described in U.S. Pat. Nos. 3,832,316; 4,010,296; 3,137,607; 2,935,471; 2,917.408; 3,159,503; 6,652,633; 4.725,382; 5,151,225; 4, 461,720; 4,373,0101; 4,373,010; 4,514,326; 4,725,382; 6,517,748; 6,306,317 and Canadian Patent No. 917,334 (each incorporated by reference in their entireties). In one embodiment, the fire-retardant compositions comprise a phosphoric acid in free form or a phosphate compound and a boron or nitrogen compound. Non-limiting examples of phosphoric acid or phosphate compounds include ammonium phosphate, monoammonium phosphate, diammonium phosphate, ammonium polyphosphate, phosphoric acid, metal salts of phosphorous acid and its salts, such as sodium/potassium phosphate, polyphosphoric acid and its ammonium or metal salts, phosphoric acid, melamine phosphate, phosphonic acid or its ammonium or metal salts or phosphonate compounds, guanylurea phosphate, guanidine phosphate, mono-guanidine phosphate, di-guanidine phosphate and tri-guanidine phosphate. Examples of phosphonic acid or phosphonate compounds include aminomethylphosphonic acid; dimethyl methylphosphonate; 1-Hydroxyethylidene-1,1-diphosphonic acid; amino tris (methylenephosphonic acid); ethylenediamine tetra (methylene phosphonic acid); tetramethylenediamine tetra (methylene phosphonic acid); hexamethylenediamine tetra (methylene phosphonic acid); diethylenetriamine penta (methylene phosphonic acid); phosphonobutane-tricarboxylic acid; N-(phosphonomethyl)iminodiacetic acid; 2-carboxyethyl phosphonic acid; 2-Hydroxyphosphonocarboxylic acid; Amino-tris-(methylene-phosphonic acid); N,N-Bis(phosphonomethyl)glycine; di-(2-ethylhexyl)phosphoric acid.

In another embodiment of the present invention, the compositions are free of phosphoric acid and phosphate compounds. In another embodiment, the fire-retardant impregnates of the present invention may be substantially free of phosphates, ammonia and salts thereof. As used herein, the term "substantially free of phosphates, ammonia and salts thereof" means no more than 0.1, 0.5, 1.0, 2.0 or 5.0% by weight of the fire-retardant impregnate. Such compositions may comprise boron and/or nitrogen compounds. For example, suitable fire retardant compositions include those compositions comprising one or more ureas, dicyandiamide, ammonia, ammonium salts and various amines and the like. Nitrogen-containing compounds can also be used in the phosphate based formulation or non-phosphate based formulation. Non-limiting examples of nitrogen compounds contain ammonia solution; ammonium hydroxide; dicyandiamide; urea; various amine compounds, such as alkanolamines, monoethanolamine, diethanolamine, triethanolamine, ethylenediamine, etc. These nitrogen-containing compounds may be mixed with boron-containing compounds. Boron compounds contemplated for use in the present compositions may include boric acid, sodium borates, such as sodium tetraborate decahydrate, sodium tetraborate pentahydrate, and disodium octaborate tetrahydrate (DOT), potassium borates, and metal borate compounds such as calcium borate, borate silicate, aluminum silicate borate hydroxide, silicate borate hydroxide fluoride, hydroxide silicate borate, sodium silicate borate, calcium silicate borate, aluminum borate, boron oxide, magnesium borate, iron borate, copper borate, and zinc borate.

When mixed into or with water, the weight concentration of the fire-retardant chemicals in the treating compositions may vary from between about 1.0% to 50.0%, depending upon the applications and treating processes. In a preferred embodiment, the weight concentration of the fire-retardant chemicals can range from between about 2.0% to 20.0%. In the most preferred embodiment, the weight concentration of the fire-retardant chemicals can range from between about 5.0% to 15.0%.

The amount of fire-retardant composition in the wood products is described as the amount of a fire-retardant composition contained in a wood product in pounds per cubic foot (pcf) of total solid chemicals. The amount of fire-retardant or other wood preservative contained in a wood product may be referred to as the retention amount or gauge retention amount. The loading or retention of the total chemical solids (fire retardants) in wood products can vary from 0.1 to 10.0 pcf. In a preferred embodiment, the retention can range from 1.0 to 4.5 pcf, 1.0 to 6.0 pcf, 2.0 to 3.0 pcf and 1.5 to 3.0 pcf.

The fire-retardant compositions of the present invention can be readily packaged and shipped to treatment facilities for treating materials, e.g., wood, and to manufacturing facilities for incorporation into materials, e.g., composite wood products such as OSB, plywood and other wood products. When used with solid wood products, treatment or incorporation can be accomplished using conventional techniques, primarily pressure treatment, wherein the product is dissolved into water to form an aqueous solution prior to treatment. When used with composite wood products, the fire-retardant composition may be sprayed, dipped, brushed, or applied with microwave heating process. In a preferred embodiment for wood products, vacuum and/or pressure techniques and microwave process are used to apply the chemical into the wood product.

After applying a fire-retardant treating solution, in one embodiment the wood products are dried. Methods of drying wood products are known in the art and include kiln drying, applying radio frequency, and heating.

In the methods of the present invention, a fire retardant coating is applied to the surface of a wood product through dip coating, spray coating, brush coating, hand roller coating, vacuum coating, roll coating, or powder coating. The rheology of the coatings can be designed to work with a variety of coating techniques.

Coatings of the present invention include intumescent coatings and also coatings that are not intumescent. Intumescent coatings are those that, when exposed to heat, swell and form a char foam. The char foam will insulate the wood product and reduce heat transfer via conduction, convection and radiation.

The present invention includes fire-retardant intumescent coatings comprising a polymer (binder), a source of mineral acid catalyst such as ammonium polyphosphate or potassium tripolyphosphate, a source of carbon such as dipentaerythritol, pentaerythritol, or dextrin, and a source of non-flammable gas such as melamine, or urea. The weight concentration of the polymer may vary from between about 5.0% to 80.0%, the weight concentration of the acid source may vary from 5.0% to 80.0%, the weight concentration of the carbon source may vary from 1.0% to 60.0% and the weight concentration of the gas source may vary from 1.0% to 60.0%. In a preferred embodiment, the weight concentration of the polymer may vary from between about 10.0% to 60.0%, the weight concentration of the acid source may vary from 10.0% to 60.0%, the weight concentration of the carbon source may vary from 5.0% to 40.0% and the weight concentration of the gas source may vary from 5.0% to 40.0%. In the most preferred embodiment, the weight concentration of the polymer may vary from between about 20.0% to 50.0%, the weight concentration of the acid source may vary from 20.0% to 50.0%, the weight concentration of the carbon source may vary from 10.0% to 30.0% and the weight concentration of the gas source may vary from 10.0% to 30.0%.

The polymer can be either a resin that is synthetically produced or naturally-occurring film forming material which provides adherence of the fire retardant components to a material substrate. The binder can be selected from a dispersion of a thermoplastic polymer, a thermosetting polymeric resin, or any film forming polymeric resin capable of coalescing to a film. Non limiting examples of such polymers include aqueous dispersions of polyamide resins, polyethylene resins, polypropylene resins, and polyester resins; or traditional film forming polymers such as polyester resins, vinyl ester resins, vinyl ester ethylene copolymers, acrylic resins, styrene/acrylic copolymers, styrene/butadiene copolymers and other synthetic and natural latexes; or crosslinking polymers such as epoxies and polyurethanes.

The non-limiting examples of a source of mineral acid catalyst include phosphate, potassium tripolyphosphate, ammonium phosphate or ammonium polyphosphate. The non-limiting examples of a source of carbon include dipentaerythritol, polyurethane, pentaerythritol, sorbitol, resorcinol, inositol, polyalcohol, chlorinated paraffin, or dextrin. The non-limiting examples of a source of non-flammable gas include melamine, urea, dicyandiamide, guanidine, glycine, or combinations thereof.

The coating may include solvents, dispersants, surfactants, suspending agents, rheology modifiers or the combinations thereof. The coating may also incorporate fibrous reinforcements, threads, yarns, and fabrics of both natural and synthetic materials and combinations thereof. The non-limiting examples of fibrous reinforcements include synthetic fibers such as glass, polyamide, or graphite; and natural fibers such as hemp, jute, sisal, cotton and wool. The expandable graphite may also be incorporated in the coating.

The present invention also provides an aqueous fire-retardant composition comprising a film-forming polymer, inorganic fire retardant materials such as zinc oxide, zinc borate, zinc phosphate, huntite, hydromegnesite, aluminum trihydroxide or magnesium hydroxide, and metal stannates or metal hydroxyl stannates. Halogenated compounds, heavy metals or metallic compounds such as antimony trihydroxide may also be included in the coating.

The fire-retardant coating composition for the second step treatment is not limited to an aqueous coating, it can be solvent based coating, solvent less coating, crosslinking coatings such as epoxy and polyurethane, UV coating, Electron Beam coating, or powder coating with fire-retardant components to provide additional fire protection to the impregnate-treated wood product.

The amount of coating on the wood products can be measured by the application rate, which can also be referred to as the coat rate. The application rate refers to the actual coating deposited after solvent(s) or volatile(s) evaporate. When a coating is applied to the surface of a wood product, the application rate or coat rate can vary depending upon the impregnate treatment and/or the coating composition used. The application rate can vary from 0.001 to 10 pounds of coating product per square foot ($lbs/ft^2$) with a preferred rate of 0.01 to 1 $lbs/ft^2$. A more preferred application rate is in the range of 0.04 to 0.15 $lbs/ft^2$. A most preferred application rate is in the range of 0.04 to 0.11 $lbs/ft^2$. The application rate or coat rate can also be expressed as square feet coverage of wood surface per gallon of coating product. The application rate can vary from 1 to 1000 $ft^2$ per gallon coverage with preferred range of 10-500 $ft^2$ per gallon. A more preferred application rate range is 50-250 $ft^2$ per gallon.

The treating methods and wood products of the present invention are believed to have significant advantages over the fire-retardant treating methods and fire retardant wood products currently used in the industry. For example, a reduced amount of overall chemical loading can be used for conferring fire retardancy to wood products. In particular, a reduced amount of fire-retardant impregnate and/or coating can be used. With regard to ½-inch plywood, for example, a reduced amount of the fire-retardant impregnate in addition to a reduced amount of coating can be used. Wood products that may not otherwise pass the E-84 30-minute burn test with either the fire-retardant impregnate or coating used on their own would be able to pass the E-84 30-minute burn test. The wood products of the present invention have improved fire retardant properties, pass the E-84 30-minute burn test and exhibit low hygroscopicity. The coatings of the present invention function as a moisture barrier and prevent water from otherwise being drawn into the wood product. Also, the reduced amount of impregnate would draw less moisture from the air than a higher amount of impregnate. Furthermore, as a result of reduced hygroscopicity, the mechanical strength of the wood would not be affected or only minimally affected, and the cellulose fiber of the wood products would display increased long-term thermal stability. As a further result of reduced hygroscopicity, the wood products would be less corrosive to metal fasteners. In addition, reduced hygroscopicity would result in no or only minimal chemical blooming from the treated wood product. Moreover, reduced loading or concentrations of chemicals would provide significant cost savings for the industry in manufacturing fire-retardant wood products.

Examples 1-7 shows that ½-inch plywood passed the ASTM E-84 30-minute burn test when treated with methods according to the instant invention. By contrast, as set forth in Reference Examples A-I and J-M, ½-inch plywood did not pass the ASTM E-84 30-minute burn test when treated with either a fire retardant impregnate alone or an intumescent coating alone.

The Examples listed below illustrate methods for preparing and treating various compositions according to the invention. These Examples below, illustrate methods for preparing alternative versions of the inventive composition. The methods described in these Examples are illustrative only, and are not intended to limit the invention in any manner and should not be construed to limit the scope of claims herein. Reference Examples A-I are pressure impregnation alone, and none of the tests in these examples passed the E-84 30-minutes extended test. Examples J-M are intumescent coating alone, and none of the tests in these examples passed the E-84 30-minute extended test. Examples 1-14 demonstrate the two-step process disclosed by the present invention.

EXAMPLES

Reference Example A

An aqueous fire-retardant treating solution was prepared by mixing mono-ammonium phosphate (MAP), di-ammonium phosphate (DAP) and boric acid (BA) with water. The concentrations of MAP, DAP and BA in the treating solution were about 1.14%, 3.49% and 0.82%, respectively. So, the total solid concentration in the solution was about 5.45%. The solution was used to treat ¾" southern yellow pine (SYP) plywood panels using a modified full cell treating cycle. After treatment, the gauge retention of the FR solid concentration in the plywood panels was about 2.0 pcf. The plywood panels were subjected to ASTM E-84 extended 30-minute burn test. The maximum flame distance was about 17.0 feet after 30-min test.

Reference Example B

An aqueous fire-retardant treating solution was prepared by mixing mono-ammonium phosphate (MAP), di-ammonium phosphate (DAP) and boric acid (BA) with water. The concentrations of MAP, DAP and BA in the treating solution are about 1.16%, 3.52% and 0.83%, respectively. The total solid concentration in the solution was about 5.5%. The solution was used to treat ¾" southern yellow pine plywood panels using a modified full cell treating cycle. After treatment, the gauge retention of the FR solid concentration in the plywood panels was about 2.0 pcf. The plywood panels were subjected to ASTM E-84 extended 30-minute burn test. The maximum flame distance was about 7.5 feet after 30-min test.

Reference Example C

An aqueous fire-retardant treating solution was prepared by dissolving boric acid, sodium tetraborate pentahydrate, urea, dicyandiamide in water at a ratio of boric acid:sodium borate:urea:dicyandiamide about 2.1:3.8:1.5:1. The total solid concentration in the solution was about 8.0%. The solution was used to treat ¾" southern yellow pine plywood panels using a modified full cell treating cycle. After treatment, the gauge retention of the FR solid concentration in the plywood panels was about 3.0 pcf. The plywood panels were subjected to ASTM E-84 extended 30-minute burn test. The maximum flame distance was about 11.5 feet after 30-min test.

Reference Example D

An aqueous fire-retardant treating solution was prepared by dissolving boric acid, sodium tetraborate pentahydrate, urea, and dicyandiamide in water. The concentrations of boric acid, sodium borate, urea and dicyandiamide are about 5.0%, 9.0%, 3.6% and 2.4%, respectively. The total solid concentration in the solution was about 20.0%. The solution was used to treat ¾" southern yellow pine plywood panels using a modified full cell treating cycle. After treatment, the gauge retention of the FR solid concentration in the plywood panels was about 7.80 pcf. The plywood panels were subjected to ASTM E-84 extended 30-minute burn test. The maximum flame distance was about 8.0 feet after 30-min test.

Reference Example E

An aqueous fire-retardant treating solution was prepared by dissolving boric acid, sodium tetraborate pentahydrate, urea, dicyandiamide in water. The concentrations of boric acid, sodium borate, urea and dicyandiamide are about 4.0%, 7.2%, 2.9% and 1.9%, respectively. The total solid concentration in the solution was about 16.0%. The solution was used to treat ¾" southern yellow pine plywood panels using a modified full cell treating cycle. After treatment, the gauge retention of the FR solid concentration in the plywood panels was about 6.20 pcf. The plywood panels were subjected to ASTM E-84 extended 30-minute burn test. The maximum flame distance was about 9.5 feet after 30-min test.

Reference Example F

An aqueous fire-retardant treating solution was prepared by dissolving 6.3% monoammonium phosphate, 1.2% boric acid and 2.5% ethylenediamine in water. The total solid concentration in the solution was about 10.0%. The solution was used to treat ½" southern yellow pine plywood panels using a modified full cell treating cycle. After treatment, the gauge retention of the FR solid concentration in the plywood panels was about 4.0 pcf. The plywood panels were subjected to ASTM E-84 extended 30-minute burn test. The maximum flame distance was about 10.0 feet after 30-min test.

Reference Example G

An aqueous fire-retardant treating solution was prepared by dissolving 5.2% monoammonium phosphate, 1.0% boric acid and 2.1% ethylenediamine in water. The total solid concentration in the solution was about 8.3%. The solution was used to treat ½" Douglas fir plywood panels using a modified full cell treating cycle. After treatment, the gauge retention of the FR solid concentration in the plywood panels was about 2.5 pcf. The plywood panels were subjected to ASTM E-84 extended 30-minute burn test. The maximum flame distance was about 7.5 feet after 30-min test.

Reference Example H

An aqueous fire-retardant treating solution was prepared by mixing 6.0% phosphoric acid, 1.4% boric acid and 4.0% ethylenediamine in water. The solution was used to treat ½" southern yellow plywood panels using a modified full cell treating cycle. After treatment, the gauge retention of the FR solid concentration in the plywood panels was about 4.0 pcf. The plywood panels were subjected to ASTM E-84 extended 30-minute burn test. The maximum flame distance was about 10.0 feet after 30-min test.

Reference Example I

An aqueous fire-retardant treating solution was prepared by dissolving 4.4% phosphoric acid, 1.0% boric acid and 2.9% ethylenediamine in water. The total solid concentration in the solution was about 8.3%. The solution was used to treat ½" Douglas fir plywood panels using a modified full cell treating cycle. After treatment, the gauge retention of the FR solid concentration in the plywood panels was about 2.5 pcf. The plywood panels were subjected to ASTM E-84 extended 30-minute burn test. The maximum flame distance was about 11.0 feet after 30-min test.

Reference Example J

An untreated Southern Yellow Pine (SYP) plywood was coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.090 lbs/ft$^2$.

The plywood panels were subjected to ASTM E-84 extended 30-minute burn test. The maximum flame distance was about 14.0 feet after 30-min test.

Reference Example K

An untreated Southern Yellow Pine (SYP) plywood was coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.141 lbs/ft$^2$.

The plywood panels were subjected to ASTM E-84 extended 30-minute burn test. The maximum flame distance was about 8.0 feet after 30-min test.

Reference Example L

An untreated Southern Yellow Pine (SYP) plywood was coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.154 lbs/ft$^2$.

The plywood panels were subjected to ASTM E-84 extended 30-minute burn test. The maximum flame distance was about 8.0 feet after 30-min test.

Reference Example M

An untreated Southern Yellow Pine (SYP) plywood was coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.182 lbs/ft$^2$.

The plywood panels were subjected to ASTM E-84 extended 30-minute burn test. The maximum flame distance was about 7.0 feet after 30-min test.

Example 1

An aqueous fire-retardant treating solution was prepared by dissolving 6.3% monoammonium phosphate, 1.2% boric acid and 2.5% ethylenediamine in water. The total solid concentration in the solution was about 10.0%. The solution was used to treat ½" southern yellow pine plywood panels using a modified full cell treating cycle. After treatment, the gauge retention of the FR solid concentration in the plywood panels was about 4.21 pcf. The treated plywood was kiln-dried prior to the second step coating.

Immediately after the kiln-drying, the plywood was coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.088 lbs/ft$^2$.

The plywood panels were subjected to ASTM E-84 extended 30-minute burn test. The maximum flame distance was about 4.0 feet after 30-min test.

Example 2

An aqueous fire-retardant treating solution was prepared by dissolving 6.3% monoammonium phosphate, 1.2% boric acid and 2.5% ethylenediamine in water. The total solid concentration in the solution was about 10.0%. The solution was used to treat ½" southern yellow pine plywood panels using a modified full cell treating cycle. After treatment, the gauge retention of the FR solid concentration in the plywood panels was about 4.17 pcf. The treated plywood was kiln-dried prior to the second step coating.

Immediately after kiln-drying, the plywood was coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.090 lbs/ft$^2$.

The plywood panels were subjected to ASTM E-84 extended 30-minute burn test. The maximum flame distance was about 2.5 feet after 30-min test.

Example 3

An aqueous fire-retardant treating solution was prepared by dissolving 3.1% monoammonium phosphate, 0.6% boric acid and 1.3% ethylenediamine in water. The total solid concentration in the solution was about 5.0%. The solution was used to treat ½" southern yellow pine plywood panels using a modified full cell treating cycle. After treatment, the gauge retention of the FR solid concentration in the plywood panels was about 2.03 pcf. The treated plywood was kiln-dried prior to the second step coating.

The plywood was then coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.091 lbs/ft$^2$.

The plywood panels were subjected to ASTM E-84 extended 30-minute burn test. The maximum flame distance was about 4.0 feet after 30-min test.

Example 4

An aqueous fire-retardant treating solution was prepared by dissolving 3.1% monoammonium phosphate, 0.6% boric acid and 1.3% ethylenediamine in water. The total solid concentration in the solution was about 5.0%. The solution was used to treat ½" southern yellow pine plywood panels using a modified full cell treating cycle. After treatment, the gauge retention of the FR solid concentration in the plywood panels was about 2.01 pcf. The treated plywood was kiln-dried prior to the second step coating.

The plywood was then coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.090 lbs/ft$^2$.

The plywood panels were subjected to ASTM E-84 extended 30-minute burn test. The maximum flame distance was about 5.5 feet after 30-min test.

Example 5

An aqueous fire-retardant treating solution was prepared by dissolving boric acid, sodium tetraborate pentahydrate, urea, dicyandiamide in water at a ratio of boric acid:sodium borate:urea:dicyandiamide about 2.1:3.8:1.5:1. The total solid concentration in the solution was about 7.5%. The solution was used to treat ½" southern yellow pine plywood panels using a modified full cell treating cycle. After treatment, the gauge retention of the FR solid concentration in the plywood panels was about 2.96 pcf. The treated plywood was kiln-dried prior to the second step coating.

The plywood was then coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.094 lbs/ft$^2$.

The plywood panels were subjected to ASTM E-84 extended 30-minute burn test. The maximum flame distance was about 4.0 feet after 30-min test.

Example 6

An aqueous fire-retardant treating solution was prepared by dissolving boric acid, sodium tetraborate pentahydrate, urea, dicyandiamide in water at a ratio of boric acid:sodium borate:urea:dicyandiamide about 2.1:3.8:1.5:1. The total solid concentration in the solution was about 7.5%. The solution was used to treat ½" southern yellow pine plywood panels using a modified full cell treating cycle. After treatment, the gauge retention of the FR solid concentration in the plywood panels was about 2.91 pcf. The treated plywood was kiln-dried prior to the second step coating.

The plywood was then coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.090 lbs/ft$^2$.

The plywood panels were subjected to ASTM E-84 extended 30-minute burn test. The maximum flame distance was about 5.5 feet after 30-min test.

Example 7

An aqueous fire-retardant treating solution was prepared by dissolving boric acid, sodium tetraborate pentahydrate, urea, dicyandiamide in water at a ratio of boric acid:sodium borate:urea:dicyandiamide about 2.1:3.8:1.5:1. The total solid concentration in the solution was about 7.5%. The solution was used to treat ½" southern yellow pine plywood panels using a modified full cell treating cycle. After treatment, the gauge retention of the FR solid concentration in the plywood panels was about 2.94 pcf. The treated plywood was kiln-dried prior to the second step coating.

The plywood was then coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.087 lbs/ft$^2$.

The plywood panels were subjected to ASTM E-84 extended 30-minute burn test. The maximum flame distance was about 6.0 feet after 30-min test.

Example 8

½" SYP plywood is heated with a form of microwave or radio frequency energy, preferably at a frequency below 100 MHz, and more preferably at a pressure of between 20 to 50 MHz. This allows immediate heating of the plywood. After a time when sufficient energy has been applied, the desired temperature of less than 150° C. is achieved throughout the substrate. Immediately after the heating, the heated plywood is allowed in contact with a fire retardant treating solution containing boron compounds and nitrogen compounds. The total solid retention in the plywood is about 2.0 pcf. After the microwave treatment, the plywood is coated with a phosphate/polymer based intumescence fire retardant coating with an application rate of 0.05 lbs/ft$^2$, and the resulting plywood will be subjected to ASTM E-84 extended 30-min test.

Example 9

An aqueous fire-retardant treating solution was prepared by mixing mono-ammonium phosphate (MAP), di-ammonium phosphate (DAP) and boric acid (BA) with water. The concentrations of MAP, DAP and BA in the treating solution were about 1.14%, 3.49% and 0.82%, respectively. So, the total solid concentration in the solution was about 5.45%. The solution was used to treat ½" southern yellow pine (SYP) plywood panels using a modified full cell treating cycle. After treatment, the gauge retention of the FR solid concentration in the plywood panels was about 2.0 pcf.

The plywood was then coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.107 lbs/ft2.

The plywood panels were subjected to ASTM E-84 extended 30-minute burn test. The maximum flame distance was about 2.0 feet after 30-min test.

Example 10

An aqueous fire-retardant treating solution was prepared by mixing mono-ammonium phosphate (MAP), di-ammonium phosphate (DAP) and boric acid (BA) with water. The concentrations of MAP, DAP and BA in the treating solution were about 1.14%, 3.49% and 0.82%, respectively. So, the total solid concentration in the solution was about 5.45%. The solution was used to treat ½" southern yellow pine (SYP) plywood panels using a modified full cell treating cycle. After treatment, the gauge retention of the FR solid concentration in the plywood panels was about 2.0 pcf.

The plywood was then coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.105 lbs/ft2.

The plywood panels were subjected to ASTM E-84 extended 30-minute burn test. The maximum flame distance was about 2.5 feet after 30-min test.

Example 11

An aqueous fire-retardant treating solution was prepared by mixing mono-ammonium phosphate (MAP), di-ammonium phosphate (DAP) and boric acid (BA) with water. The concentrations of MAP, DAP and BA in the treating solution were about 1.14%, 3.49% and 0.82%, respectively. So, the total solid concentration in the solution was about 5.45%. The solution was used to treat ½" southern yellow pine (SYP) plywood panels using a modified full cell treating cycle. After treatment, the gauge retention of the FR solid concentration in the plywood panels was about 2.0 pcf.

The plywood was then coated with an intumescent coating prepared with an aqueous polymer emulsion at 12.8%, ammonium polyphosphate at 33.9%, pentaerythritol at 13.5%, and melamine at 11.2%. Hand roller was used to apply desired coating weight on the plywood. The coating application rate was 0.107 lbs/ft2.

The plywood panels were subjected to ASTM E-84 extended 30-minute burn test. The maximum flame distance was about 3.0 feet after 30-min test.

Example 12

⅝" SYP plywood is heated with a form of microwave or radio frequency energy, preferably at a frequency below 100 MHz, and more preferably at a pressure of between 20 to 50 MHz. This allows immediate heating of the plywood. After a time when sufficient energy has been applied, the desired temperature of less than 150° C. is achieved throughout the substrate. Immediately after the heating, the heated plywood is allowed in contact with a fire retardant treating solution comprising a phosphate compound, a boron compounds and nitrogen compounds. The total solid retention in the plywood is about 2.0 pcf. After the microwave treatment, the plywood is coated with a phosphate/polymer based intumescence fire retardant coating with an application rate of 0.075 lbs/ft², and the resulting plywood will be subjected to ASTM E-84 extended 30-min test.

Example 13

½" OSB is heated with a form of microwave or radio frequency energy, preferably at a frequency below 100 MHz, and more preferably at a pressure of between 20 to 50 MHz. This allows immediate heating of the OSB. After a time when sufficient energy has been applied, the desired temperature of less than 150° C. is achieved throughout the substrate. Immediately after the heating, the heated plywood is allowed in contact with a fire retardant treating solution comprising a boron-containing compound and a nitrogen-containing compound. The total solid retention in the plywood is about 2.0 pcf. After the microwave treatment, the plywood is coated with a phosphate/polymer based intumescence fire retardant coating with an application rate of 0.06 lbs/ft², and the resulting plywood will be subjected to ASTM E-84 extended 30-min test.

Example 14

⅝" OSB is heated with a form of microwave or radio frequency energy, preferably at a frequency below 100 MHz, and more preferably at a pressure of between 20 to 50 MHz. This allows immediate heating of the OSB. After a time when sufficient energy has been applied, the desired temperature of less than 150° C. is achieved throughout the substrate. Immediately after the heating, the heated plywood is allowed in contact with a fire retardant treating solution comprising a phosphate compound, a boron-containing compound and a nitrogen-containing compound. The total solid retention in the plywood is about 1.0 pcf. After the microwave treatment, the plywood is coated with a phosphate/polymer based intumescence fire retardant coating with an application rate of 0.05 lbs/ft², and the resulting plywood will be subjected to ASTM E-84 extended 30-min test.

What is claimed is:

1. A method of treating an engineered wood product comprising the steps of:
    applying an aqueous fire-retardant impregnate by pressure or vacuum treatment or microwave treatment to an engineered wood product with a thickness of approximately ½ inch in an amount of about 1 to about 4.5 pcf, such that the impregnate penetrates the engineered wood product; and
    applying a coating to the engineered wood product surface in an amount of about 0.04 to about 0.11 lbs/ft²;
    wherein said coating is an intumescent coating comprising a polymer binder, a source of mineral acid catalyst, a source of carbon, and a source of non-flammable gas; and
    wherein said polymer binder is selected from the group consisting of a dispersion of a thermoplastic polymer, a thermosetting polymeric resin, a film forming polymeric resin, an aqueous dispersion of polyamide resins, polyethylene resins, polypropylene resins, polyester resins, polyester resins, vinyl ester resins, vinyl ester ethylene copolymers, acrylic resins, styrene/acrylic copolymers, styrene/butadiene copolymers, synthetic or natural latexes, epoxies and polyurethanes.

2. The method of claim 1, wherein said coating may incorporate fibrous reinforcements, threads, yarns, and fabrics of both natural and synthetic materials and combinations thereof.

3. The method of claim 2, wherein said fibrous reinforcements are synthetic fibers.

4. The method of claim 2, wherein said fibrous reinforcements are glass.

5. The method of claim 2, wherein said fibrous reinforcements are polyamide.

6. The method of claim 2, wherein said fibrous reinforcements are graphite.

7. The method of claim 2, wherein said fibrous reinforcements are natural fibers.

8. The method of claim 2, wherein said fibrous reinforcements are hemp.

9. The method of claim 2, wherein said fibrous reinforcements are jute.

10. The method of claim 2, wherein said fibrous reinforcements are sisal.

11. The method of claim 2, wherein said fibrous reinforcements are cotton.

12. The method of claim 2, wherein said fibrous reinforcements are wool.

* * * * *